United States Patent
Lee et al.

(10) Patent No.: US 10,798,001 B2
(45) Date of Patent: Oct. 6, 2020

(54) SOFTWARE DEFINED NETWORKING (SDN) CONTROLLER ORCHESTRATION AND NETWORK VIRTUALIZATION FOR DATA CENTER INTERCONNECTION

(71) Applicant: Futurewei Technologies, Inc., Plano, TX (US)

(72) Inventors: Young Lee, Plano, TX (US); Maarten Vissers, Huizen (NL); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 222 days.

(21) Appl. No.: 15/978,867

(22) Filed: May 14, 2018

(65) Prior Publication Data
US 2018/0270155 A1    Sep. 20, 2018

Related U.S. Application Data

(63) Continuation of application No. 14/245,029, filed on Apr. 4, 2014, now Pat. No. 9,973,429.
(Continued)

(51) Int. Cl.
*H04L 12/24* (2006.01)
*H04L 12/751* (2013.01)
(Continued)

(52) U.S. Cl.
CPC .............. *H04L 47/10* (2013.01); *H04L 41/12* (2013.01); *H04L 45/02* (2013.01); *H04L 45/586* (2013.01); *Y02D 30/30* (2018.01)

(58) Field of Classification Search
CPC . H04L 41/12; H04L 41/0893; H04L 41/5054; H04L 45/02; H04L 45/64; H04L 12/4641
See application file for complete search history.

(56) References Cited

U.S. PATENT DOCUMENTS

| | | |
|---|---|---|
| 2010/0211810 A1 | 8/2010 | Zacho et al. |
| 2011/0019674 A1 | 1/2011 | Iovanna et al. |
| (Continued) | | |

OTHER PUBLICATIONS

Goudjil, Virtual Network Operator (VNO) Solutions, Oct. 9, 2011, Tata Communications, 2 pages.
(Continued)

*Primary Examiner* — Hoon J Chung
(74) *Attorney, Agent, or Firm* — James Anderson Harrison

(57) ABSTRACT

A data center interconnection (DCI) network may comprise a data center controller (DCC) managing a plurality of data centers (DCs) interconnected by a provider network managed by a network provider controller (NPC). The provider network may be an OpenFlow based software defined networking (SDN) transport network. The DCC may initiate a virtual network service (VNS) negotiation with the NPC to connect the DCs and may specify a network abstraction granularity level. The NPC may respond by computing paths through the provider network accordingly and providing the DCC with one or more virtual networks (VNs). The DCC may compute virtual paths through the VNs and send virtual network element (VNE) connection setup commands to the DCC. The DCC may convert the VNE connection setup commands into network element (NE) commands to setup connections in NEs of the provider network. The DCC and the NPC may perform fault monitoring, detection, and recovery.

26 Claims, 11 Drawing Sheets

Related U.S. Application Data

(60) Provisional application No. 61/808,893, filed on Apr. 5, 2013.

(51) Int. Cl.
*H04L 12/801* (2013.01)
*H04L 12/713* (2013.01)

(56) References Cited

U.S. PATENT DOCUMENTS

| | | |
|---|---|---|
| 2015/0030032 A1 | 1/2015 | Sinn et al. |
| 2015/0256407 A1* | 9/2015 | Iizawa ................ H04L 41/5051 370/254 |

OTHER PUBLICATIONS

Kiess et al., Network virtualization in G-Lab COMCON (abstract), Jul. 23-24, 2012, 12th Wurzburg Workshop on IP: ITG Workshop, "Visions of Future Generation Network" (EuroView2012), 3 pages.
G-Labs, Network virtualization in G-Lab COMCON (Slides), Jul. 23-24, 2012, 12th Wurzburg Workshop on IP: ITG Workshop, "Visions of Future Generation Network" (EuroView2012), 8 pages.
Myslinski, P., et al.. Ed-, "Optical Transport Use Cases, Optical Transport WG", Open Networking Foundation, Sep. 2013, 41 pages.
"Lee, Y., Ed., ""Service Provider DC Interconnection Use Case"", Open Networking Foundation, Version 1, Apr. 29, 2013, 11 pages."

* cited by examiner

SOFTWARE DEFINED NETWORKING (SDN) CONTROLLER ORCHESTRATION AND NETWORK VIRTUALIZATION FOR DATA CENTER INTERCONNECTION

CROSS-REFERENCE TO RELATED APPLICATIONS

This application is a continuation of U.S. patent application Ser. No. 14/245,029, filed on Apr. 4, 2014, which claims priority to U.S. Provisional Patent Application 61/808,893, filed Apr. 5, 2013 by Young Lee, et. al., and entitled "SDN Controller Orchestration and Network Virtualization for Data Center Interconnection", all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some data center interconnections (DCIs) may employ pre-allocated static wide area network (WAN) optical connections. The pre-allocated capacity between data center (DC) sites may be designed for peak data rate and may be underutilized due to fluctuating traffic demands. The static design of DCI may not be suitable for dynamic allocation of new applications to one DC site out of a plurality of candidate DC sites with associated WAN bandwidth adjustment. For example, a first DC may wish to migrate some workload and/or data on the fly to a second DC for load balancing or fault recovery, which may not be accomplished in an efficient manner by a static DCI.

Software defined networking (SDN) may be a networking paradigm in which data forwarding (e.g. data plane) may be decoupled from control decisions (e.g. control plane), such as routing, resources and other management functionalities. The decoupling may also allow the data plane and the control plane to operate on different hardware, in different runtime environments, and/or operate using different models. In an SDN network, network intelligence may be logically centralized in software-based controllers (e.g. SDN controllers), which may configure network nodes (e.g. via OpenFlow protocol) and control application data traffic flow (e.g. compute optimal network paths) in the SDN network independent of network hardware. There may be a growing interest for network providers or service providers to adopt SDN over an underlying network to provide more flexible and scalable transport SDN networks suitable for DCI.

SUMMARY

An SDN controller orchestration and network virtualization mechanism for data center interconnection is disclosed herein. In one example embodiment, the disclosure includes a network provider controller (NPC) associated with an SDN based transport network. The NPC may create a virtual network (VN) for a data center (DC) client according to a virtual network service (VNS) negotiation initiated by a data center controller (DCC) acting on behalf of the client. The VNS negotiation initiation may comprise network addresses of one or more source DC endpoints, network addresses of one or more destination DC endpoints, and a traffic matrix element comprising traffic characteristics between the source DC endpoints and the destination DC endpoints. The NPC may compute a plurality of network paths that traverse the network between the source DC endpoints and the destination DC endpoints according to the traffic matrix element. The NPC may abstractly represent the computed network paths in a form of a virtual network topology (VNT) and send the VNT to the DCC.

In another example embodiment, the disclosure includes a DCC that employs an SDN based transport network for transporting data traffic. The DCC may initiate a VNS negotiation with an NPC. The DCC may send a VNS negotiation initiation message to the NPC. The initiation message may comprise a network address of a source DC endpoint, network addresses of one or more destination DC endpoints, and a network abstraction granularity level. The DCC may receive a VNS response from the NPC. The VNS response may comprise a VNT that comprises virtual network paths that connect the source DC endpoint to the destination DC endpoints. The virtual network paths may abstractly represent paths in the network according to the network abstraction granularity level indicated in the VNS negotiation initiation message.

In yet another example embodiment, the disclosure includes a method implemented in an NPC. The NPC may negotiate with a DCC to identify a set of endpoints that a DC wishes to connect. The NPC may receive, from the DCC, traffic characteristics that need to be supported between the set of endpoints. The NPC may create a VN by initiating a request to a virtual path computation entity of the NPC to compute paths between the set of endpoints. The NPC may allocate network resources to fulfill the VN and may notify the DCC of availability of the VN for transport of information between the endpoints.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like part.

DETAILED DESCRIPTION

Figure 1:
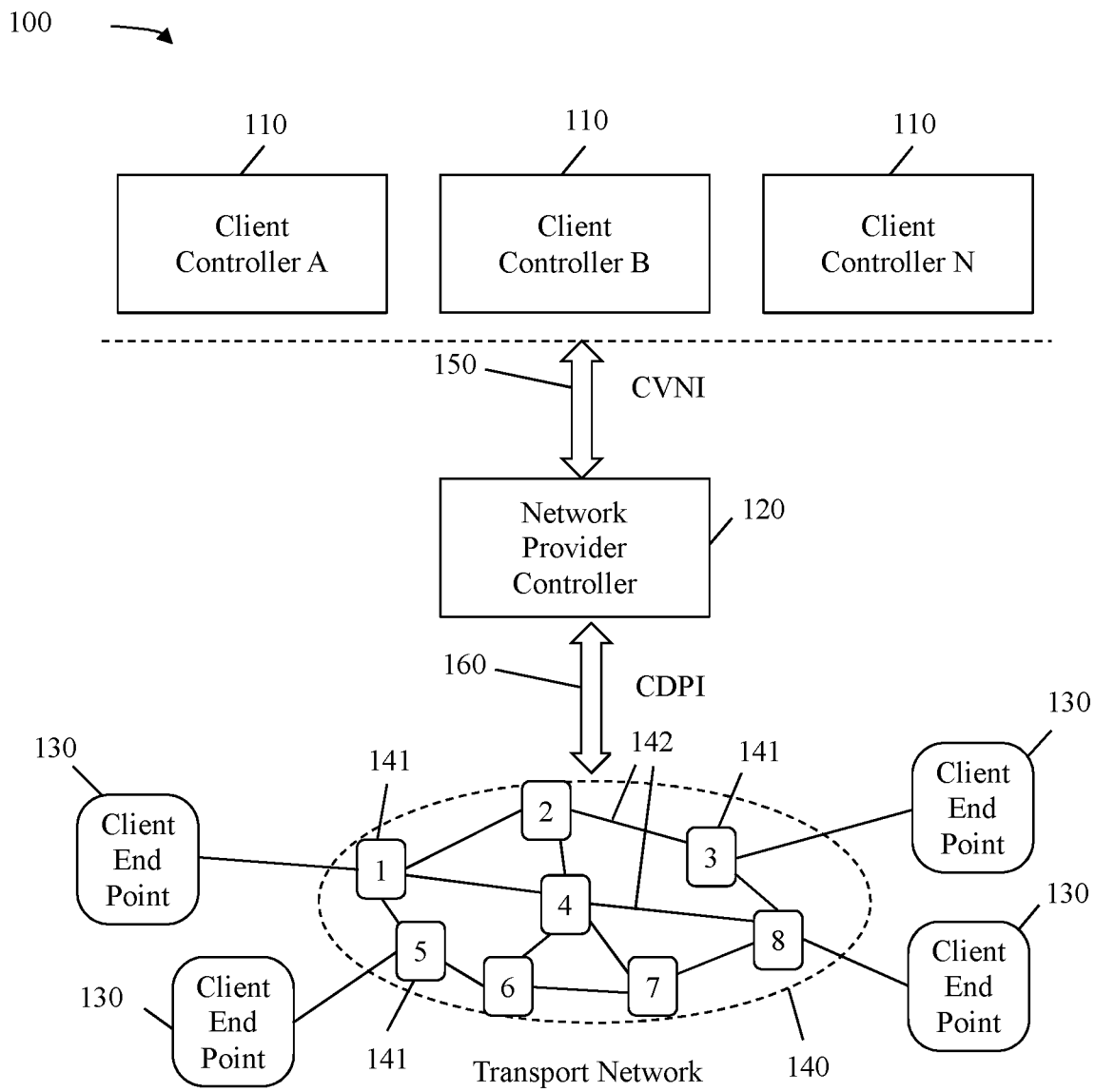
FIG. 1 is a schematic diagram of an example embodiment of an OpenFlow based transport SDN architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

DCs may provide a wide variety of Internet services including web-hosting, e-commerce, enterprise, social networking, and a variety of general services, such as software as a service, platform as a service, infrastructure as a service, and cloud computing services. Network virtualization may be a key to providing many of these Internet services and may be increasingly employed within DCs to achieve better utilization of network resources and more flexible resource allocation. A DC operator may operate a plurality of DCs physically located in different geographical sites, where the DCs may be interconnected by a transport network (e.g. provider network) operated by a network provider. The network provider may or may not be the same owner as the DC operator. For example, when a provider owns both the provider network and the DCs, the provider may have full control in optimizing resource utilization. However, when the network and the DCs are owned by different organizations (e.g. private and public) or a mix of organizations (e.g. cloud bursting), optimization may be more limited. As such, DC controls and provider network controls may be separated to allow for optimizations in the respective domains. For example, an NPC may control a provider network and a DCC may control DCs connected by the provider network. The DCC may be an internal client to the NPC when the provider owns both the network and the DCs. Conversely, the DCC may be an external client to the NPC when the DCs are owned by third party.

Disclosed herein are SDN controller orchestration and network virtualization mechanisms for DCI. A DCI network may comprise one or more DCCs managing a plurality of DCs located at different geographical sites interconnected via a provider network, which may be an OpenFlow based SDN transport network. An NPC may be responsible for controlling and managing the provider network, abstracting (e.g. network slicing) the provider network into VNs (e.g. according to clients' service contracts and/or requests), and presenting the VNs to one or more clients who employ the provider network for transport of the clients' data traffic. The DCC may be responsible for coordinating with the NPC to establish and manage connections between the DCs and across multiple applications. In an embodiment, an NPC may manage and configure network nodes of a provider network and may communicate with a DCC by employing an OpenFlow protocol. In an embodiment, a DCC may initiate a VNS negotiation with an NPC to connect a plurality of DCs. The DCC may send a VNS negotiation initiation message (e.g. network query request) comprising a set of network addresses for source DC endpoints and destination DC endpoints, a traffic matrix element specifying traffic characteristics (e.g. bandwidths, latencies, etc.) between the source DC endpoints and the destination DC endpoints, and/or a network abstraction granularity level (e.g. at a network endpoint granularity or a link level granularity). In response to the VNS negotiation initiation, the NPC may compute network paths through the provider network accordingly and may send a VNS response to the DCC in a form of a VNT (e.g. network resources). The DCC may request the NPC establish a VN connection between a pair of the source and destination endpoints. In addition, the DCC and/or the NPC may perform fault monitoring, detection, and/or recovery.

FIG. 1 is a schematic diagram of an example embodiment of an OpenFlow based transport SDN architecture 100. SDN architecture 100 may comprise a plurality of client controllers (CCs) 110, an NPC 120, and a plurality of client endpoints (CEs) 130 interconnected by a transport network 140. The transport network 140 may comprise a plurality of network nodes 141 interconnected via links 142. The network nodes 141 may be switches, routers, and/or any other devices suitable for forwarding data in the transport network 140. The links 142 may comprise physical links (e.g. fiber optic links, electrical links), logical links, and or combinations thereof used to transport data. The transport network 140 may be controlled by the NPC 120 and the CEs 130 may be controlled by the CCs 110. The transport network 140 and the NPC 120 may be operating in a same administrative domain and owned by a network provider or service provider. The CCs 110 and CEs 130 may be owned by one or more client operators and may or may not be operating in a same administrative domain as the NPC 120 and the transport network 140.

NPC 120 may be a virtual machine (VM), a hypervisor, or any other device configured to manage the transport network 140 via a control data plane interface (CDPI) 160. The NPC 120 may be a software agent operating on hardware and acting on behalf of a network provider that owns the transport network 140 (e.g. provider network) and associated topology resource data. The NPC 120 may be aware and comprise a full view of a physical topology of the transport network 140. The physical topology may include all network nodes 141 and links 142 in the transport network 140. Topology resource data may comprise connectivity and available resources (e.g. path latency, bandwidths, capacity, traffic engineering (TE) data, etc.) in the transport network 140. The NPC 120 may maintain and track network resource usage in the transport network 140. In addition, the NPC 120 may be configured to provide VNS, such as VN control and management functions to one or more clients by communicating with CCs 110 via a control virtual network interface (CVNI) 150. The types of VNS may include VNS establishment and negotiation, VN creation, VN connection setup, fault monitor, fault detection, and fault recovery.

A CC 110 may be a VM, a hypervisor, or any device configured to coordinate with an NPC 120 to establish and manage network connections for the CEs 130. The CC 110 may be a software agent operating on hardware and acting on behalf of a client operator that owns the CEs 130. The CC 110 may initiate VNS requests to the NPC 120 via a CVNI 150. The requests may include VNS establishment and negotiation, VN connection setup, and/or fault monitor, detection, and recovery. In some example embodiments, a provider that provides a network (e.g. transport network 140 with an NPC 120) may also be a client that operates the CC 110 and CEs 130. In such embodiments, the CCs 110 may be an internal client controller to the NPC 120. In some other example embodiments, the CC 110 may be an external client controller to the NPC 120 when the CC 110 and CEs 130 are operated by third parties.

Each CE 130 may be an egress port of a client site network connecting to the transport network 140, where the client site networks may be physically located in different geographical locations. For example, a CE 130 may be a router, a network address translation (NAT) device gateway, or any network node configured to interface the client site network to the transport network 140. The client site network may comprise one or more network sub-domains and each network sub-domain may or may not employ a same routing protocol. An NPC 120 may identify a CE 130 via a network address of the CE 130. For example, a CC 110 may manually configure and communicate a CE 130's network address to an NPC 120. Alternatively, a link layer discovery protocol (LLDP) may be employed to discover the CE 130. It should be noted that the CC 110 and the NPC 120 may support a same network address convention in order for the NPC 120 to identify the CE 130.

CDPI 160 may be an interface that supports communication between the NPC 120 and the network nodes 141 in the transport network 140. CDPI 160 may support communication between Open System Interconnection (OSI) layers and between components in the same OSI layer. CVNI 150 may be an interface (e.g. inter-domain or intra-domain) that supports communication between the NPC 120 and CC 110. CVNI 150 may be recursively hierarchical (e.g. supporting multiple client server layers). The CDPI 160 and the CVNI 150 may be implemented in various protocols, such as an OpenFlow protocol.

The Openflow protocol is a communication protocol that provides a set of standard application programming interfaces (APIs) for a remote controller to configure, control, and manage network nodes (e.g. network nodes 141) across a network (e.g. network 140) for data forwarding. For example, an NPC 120 may compute forwarding paths (e.g. Label Switched Path (LSP)) across network 140, configure network nodes 141 with the forwarding paths (e.g. stored in flow tables), and instruct the network nodes 141 to forward data packets according to the computed forwarding paths. In addition, the NPC 120 may modify, add, and/or delete the forwarding paths dynamically to adapt to network changes (e.g. traffic demands, network conditions, faults, allocation of new applications, relocations of data, etc.).

Figure 2:
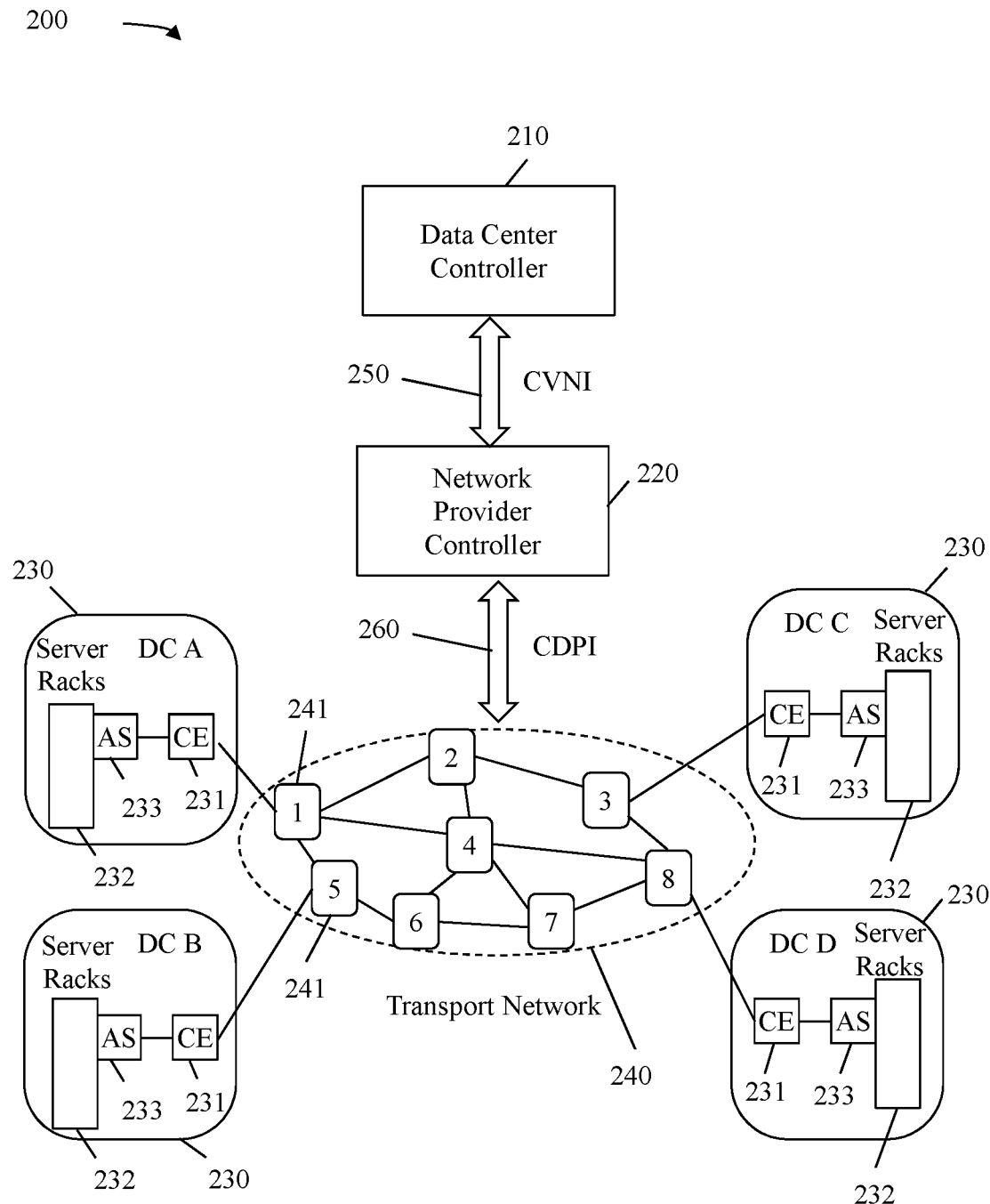
FIG. 2 is a schematic diagram of an example embodiment of a DCI network.

In an example embodiment, the SDN architecture 100 may be employed for DCI applications, where CCs 110 may be DCCs and CEs 130 may be DC CEs. FIG. 2 is a schematic diagram of an example embodiment of a DCI network 200. Network 200 may comprise a DCC 210, an NPC 220, and a plurality of DCs 230 interconnected by a transport network 240 comprising a plurality of interconnecting network nodes 241. The DCC 210, NPC 220, CVNI 250, CDPI 260, network nodes 241, and transport network 240 may be substantially similar to any of the CCs 110, NPC 120, CVNI 150, CDPI 160, network nodes 141, and transport network 140, respectively. In network 200, the DCC 210 may communicate with the NPC 220 to coordinate network connections between the DCs 230, which may be physically located in different geographical sites.

A DC 230 may be a facility configured to store data, execute processes, and/or provide network services for clients, such as end users, application service providers, other networks, etc. A DC 230 may comprise server racks 232, an aggregation server (AS) 233, and a CE 231 (e.g. CE 130). The server racks 232 may comprise a plurality of interconnected servers (e.g. interconnected by a core network) that provides the data storage, process execution, and/or network services. A DC 230 may comprise one or more network sub-domains, where the network sub-domains may employ a same routing protocol or different routing protocols and may be segregated for security and/or organizational purposes. The AS 233 may aggregate and/or distribute communications between the server racks 232 and the CE 231. The CE 231 may connect the DC 230 to the transport network 240.

A DCC 210 may be configured to provide orchestration functions with an NPC 220, provide security for the DC 230, provide NAT, etc. for DCI applications via a CVNI 250 (e.g. CVNI 150). The orchestration functions may include network query (e.g. VNS negotiation), network resource reservation (e.g. virtual network connection), fault monitor, fault detection, and fault recovery. The DCC 210 may query the NPC 220 for network resource information (e.g. bandwidth, latency, capacity, etc.) between the CEs 231. Network query may refer to pre-connection query, where the DCC 210 may select an optimal data center location from the connected DCs 230 for a given workload, data migration, and/or allocation for a new application based on the network resource availability reported by the NPC 220. For example, a DCC 210 may initiate a VNS negotiation with the NPC 220 to connect a set of DC CEs 231 (e.g. by transmitting a location profile with network addresses of source DC CEs 231 and destination DC CEs 231). The NPC 220 may also specify a traffic requirement matrix between the set of DC CEs 231. The traffic requirement matrix may include traffic characteristics (e.g. connection types, bandwidths, latency, Quality of Service (QoS), etc.) between the source DC CEs 231 and the potential destination DC CEs 231. In response to the VNS negotiation initiation, the NPC 220 may estimate network connection resources, determine connection paths (e.g. via a path computation entity (PCE)) between the source DC CEs 231 and the destination CEs 231 and reply to the DCC 210 with network resource information for each candidate connection. The NPC 220 may create a VN (e.g. instantiate the VNS) and may present the network resource estimates to the DCC 210 in the form of a VNT. For example, a VNT may comprise interconnecting virtual network elements (VNEs), which may or may not correspond directly to the network nodes 241 depending on network abstraction granularity, which may be discussed more fully below. It should be noted that the NPC 220 may track the network resources committed for the network paths in the VNT prior to setting up connections in the network paths of the VNT.

A DCC 210 may explicitly request the NPC 220 for virtual network connections between the CEs 231 after negotiating a VNS instance with the NPC 220. During virtual network connection setup, the NPC 220 may allocate and/or reserve network resources (e.g. cross-connect resources of a transport network) for network paths that are committed for the VNS instance. Some of the parameters to support network resource reservation may include endpoint addresses (e.g. source and destination endpoint addresses), connection types (e.g. point-to-point (P2P), point-to-multipoint (P2MP), multipoint-to-multipoint (MP2MP) shared pool, etc.), bandwidth information for each connection (e.g. minimum bandwidth, etc.), service duration (e.g. starting time, ending time), protection and/or restoration level (e.g. protection level, 1+1, 1:N, etc.).

A DCC 210 may monitor DC faults in the DCs 230 and may request an NPC 220 to reroute client traffic from one DC 230 to another DC 230 upon detection of DC faults. Similarly, an NPC 220 may monitor network faults and request a DCC 210 to migrate data or applications from one DC 230 to another DC 230 upon detection of network faults. In addition, fault monitor information may be exchanged between the DCC 210 and the NPC 220. The exchange of fault monitor information may be complementary to Service Level Agreement (SLA) management and may include performance notifications (e.g. with consequence actions) from the DCC 210 to the NPC 220.

In an example embodiment, each DC 230 may have a local DCC 210 and the DCCs 210 may form a confederacy or hierarchy (e.g. a logical DCC) to interface with an NPC 220. The DCC 210 may be a client to the NPC 220. The DCC 210 may be a software agent operating on hardware and operating on behalf of a DC operator, which may be responsible for coordinating network resources to meet the requirements of applications hosted in DCs 230. The NPC 220 may be a software agent operating on hardware and operating on behalf of a network provider that provides a transport network 240. The NPC 220 may be responsible for managing the transport network 240.

To support the example embodiments discussed herein, several assumptions may be made. The DCC 210 may be aware of all CE 231 interfaces that are connected to the transport network 240. Also, a data plane connection between each CE 231 interface and a corresponding endpoint interface (e.g. a user-network interface (UNI)) of the transport network 240 may have been established prior to communications between the DCC 210 and the NPC 220. Dynamic establishment of a data plane connection may be employed in some cases to support dynamic attachment to transport network 240, for example via wireless access technologies. In addition, a service contract may be in force between a DC operator that provides the DCs 230 and a network provider that provides the transport network 240. The service contract may set relevant policies regarding operations of the services available to the DC operator and by extension to the DCC 210. The NPC 220 may also be aware of the endpoint interfaces in the transport network 240 that are connected to DCs 230, operated by the DC operator, and covered by the service contract. An authentication mechanism that supports dynamic attachment to the transport network 240 (e.g. via wireless access technologies) may be employed in some example embodiments. The DCC 210 may have full visibility of (e.g. access to and/or awareness of) each DC 230 under the DCC 210's control. This visibility may include DC 230 resource information, DC 230 location information, interfaces to transport network 240 and other user/application related information.

Figure 3:
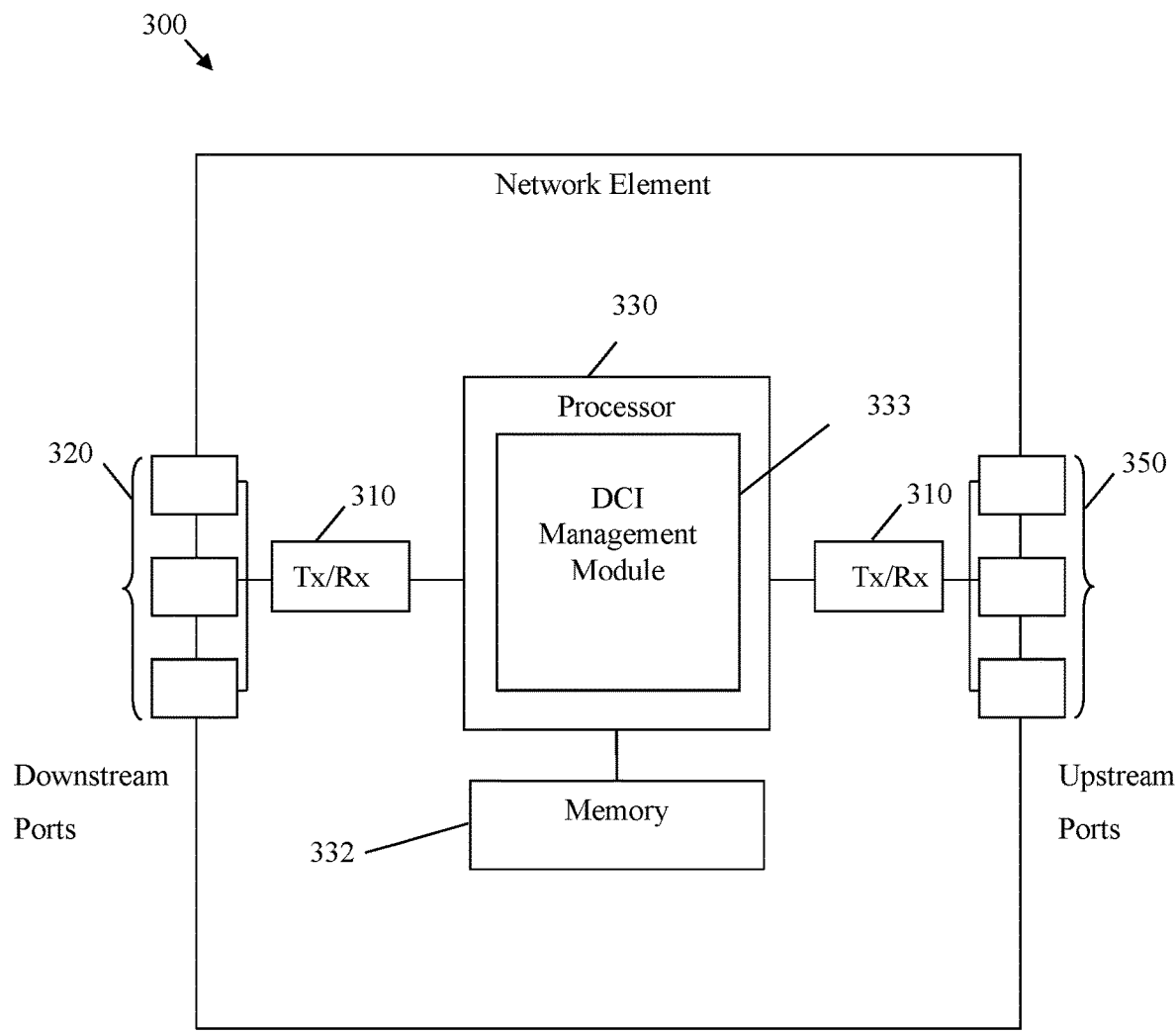
FIG. 3 is a schematic diagram of an example embodiment of a network element (NE).

FIG. 3 is a schematic diagram of an example embodiment of an NE 300, which may act as a CC (e.g. CC 110), an NPC (e.g. NPC 120 and/or 220), or a DCC (e.g. DCC 210) in a DCI network (e.g. network 100 and/or 200). NE 300 may be configured to determine paths, establish connections in a DCI network, and/or perform network fault recovery when acting as an NPC. In an alternative example embodiment, NE 300 may act as another node in network 100 and/or 200. NE 300 may be configured to perform VNS negotiation (e.g. network query), VN connection setup (e.g. network resource reservation), and/or DC fault recovery when acting as a DCC. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, respectively. A processor 330 may be coupled to the Tx/Rx 310 to process the frames and/or determine which nodes to send the frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise a DCI management module 333, which may implement a VNS negotiation method 800, a VN connection setup method 1000, and/or a fault recovery method 1200 as discussed more fully below. In an alternative embodiment, the DCI management module 333 may be implemented as instructions stored in the memory devices 332, which may be executed by processor 330. The memory device 332 may comprise a cache for temporarily storing content, e.g., a Random Access Memory (RAM). Additionally, the memory device 332 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
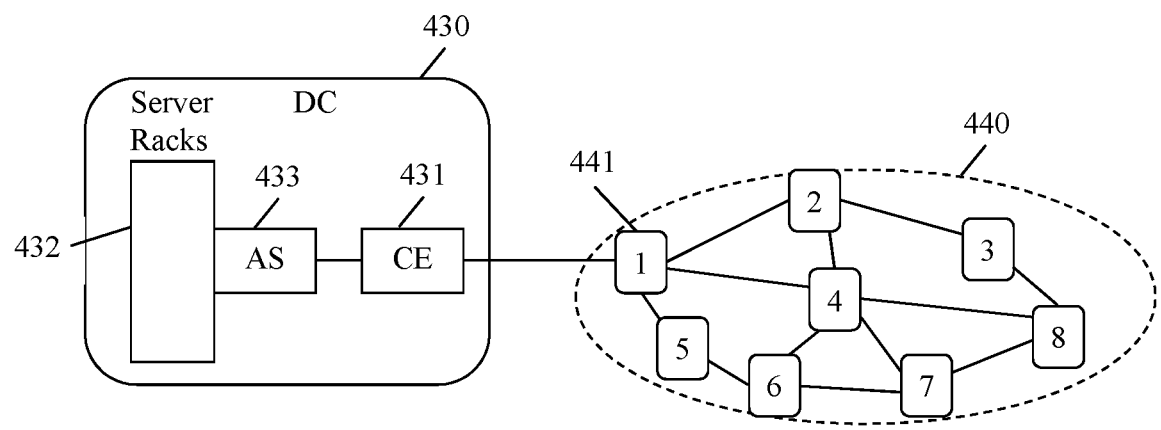
FIG. 4 is a schematic diagram of an example embodiment of a DC connecting to a provider network that operates in a same administrative domain.

FIG. 4 is a schematic diagram of an example embodiment of a DC 430 connecting to a provider network 440 that operates in a same administrative domain. The DC 430 and the provider network 440 may be substantially similar to DC 230 and network 240, respectively. The DC 430 may comprise server racks 432, an AS 433, and a CE 431. The server racks 432, the AS 433, and the CE 431 may be substantially similar to the sever rack 232, AS 233, and CE 231, respectively. Since the DC 430 and the network 440 operate in a same administrative domain, one of the DC 430's ports (e.g. CE 431) may be connected to a provider network node 441 (e.g. network node 141) and the data plane connectivity between the CE 431 and the provider network node 441 is a network-to-network interface (NNI).

Figure 5:
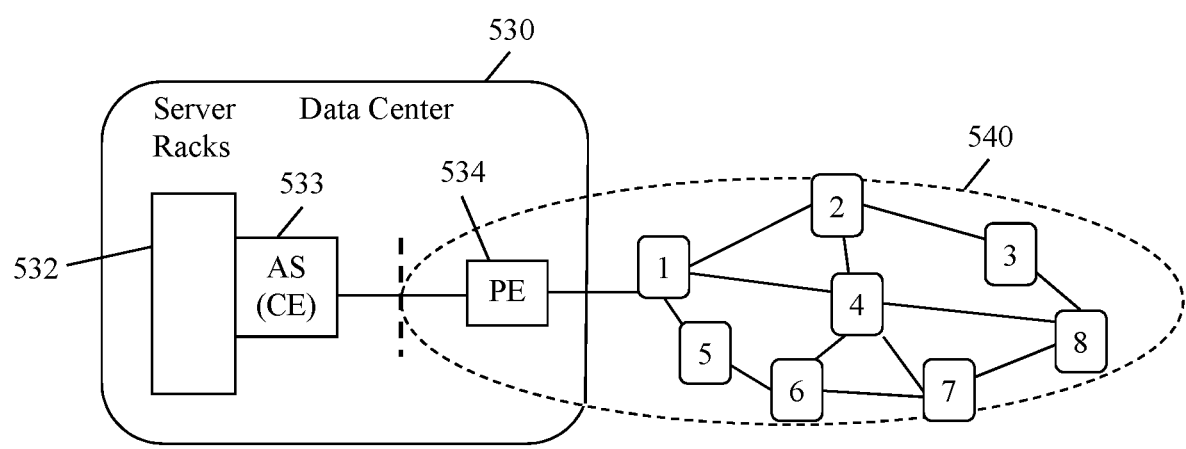
FIG. 5 is a schematic diagram of an example embodiment of a DC connecting to a provider network that operates in a different administrative domain.

FIG. 5 is a schematic diagram of an example embodiment of a DC 530 connecting to a provider network 540 that operates in a different administrative domain. The DC 530 and the provider network 540 may be substantially similar to DC 430 and network 440, respectively. However, since the DC 530 and the network 540 operate in different administrative domains, the DC 530 may comprise an additional provider edge (PE) device 534 (e.g. border router, border gateway, etc.) in addition to sever racks 532 and an AS 533, where the AS 533 may act as a CE (e.g. CE 431) for the DC 530. The AS 533 may connect to the PE device 534 in the DC point of presence (POP) over a UNI as this may be a demarcation point that separates respective administrative domains.

Figure 6:
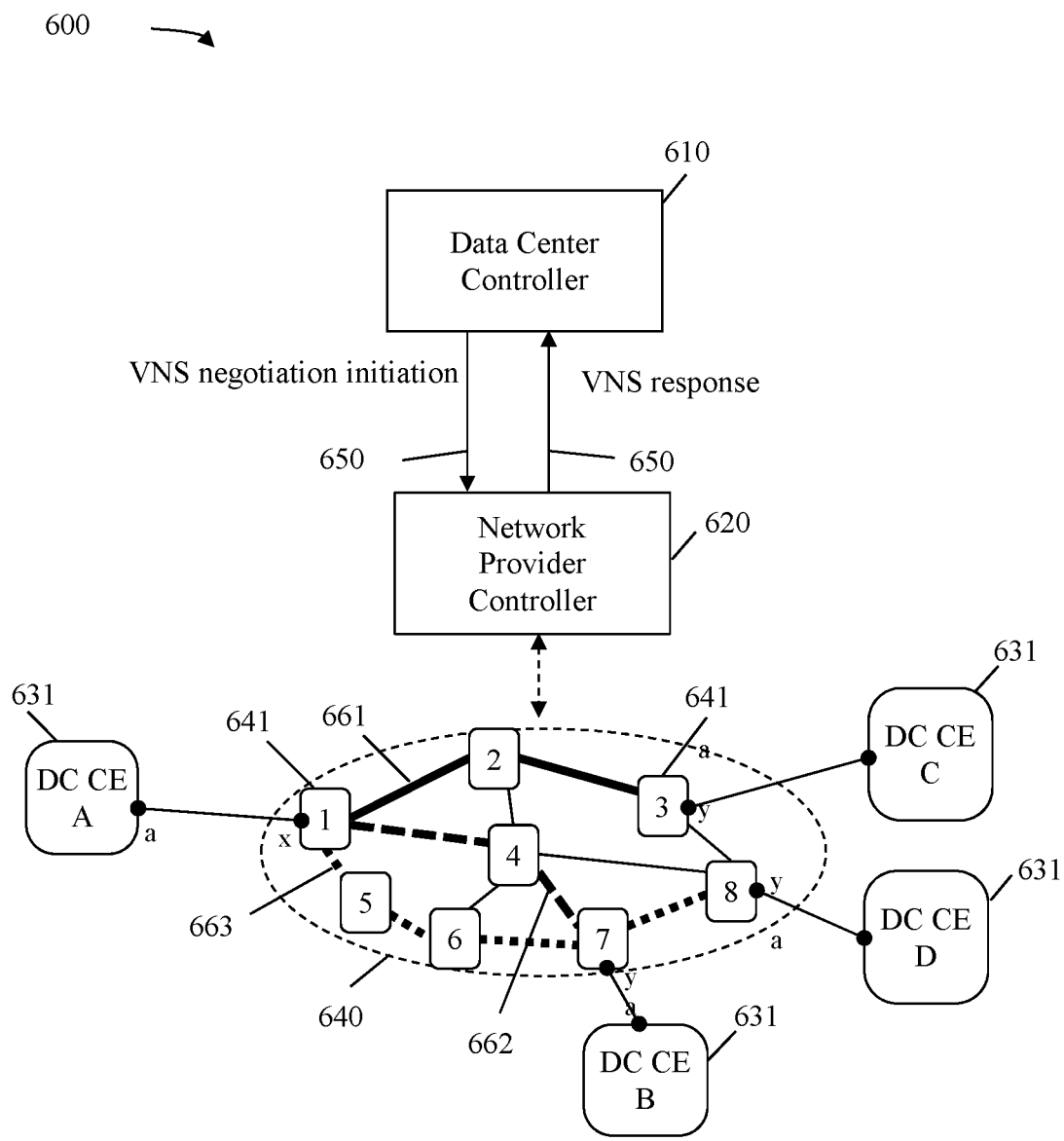
FIG. 6 illustrates an example embodiment of a VNS negotiation method in a DCI network.

FIG. 6 illustrates an example embodiment of a VNS negotiation method 600 in a DCI network, which may be substantially similar to DCI network 240. In method 600, an NPC 620 (e.g. NPC 220) may manage a transport network 640 (e.g. network 240) comprising interconnecting network nodes 641 (e.g. network nodes 241) and a DCC 610 (e.g. DCC 210) may manage a plurality of DCs (e.g. DCs 230) comprising DC CEs 631 (e.g. CE 231) connecting to the transport network 640. The NPC 620 may communicate with the DCC 610 via a CVNI 650 (e.g. CVNI 250). The DCC 610 may be interested in knowing relevant resource information of the transport network 640 (e.g. for DCI) for transport of data traffic between the DCs. For example, the DCC 610 may initiate a VNS negotiation with the NPC 620 to connect a set of the DC CEs 631 for a DCI application.

The VNS negotiation initiation may include exchanging parameters, such as a client identifier that identifies a client, a VNS instance identifier that identifies a particular instance of a VNS requested by the client, a connectivity types (e.g. P2P, M2P, M2M), a location profile (e.g. source and destination addresses of CEs), a network abstraction granularity level (e.g. a network endpoint granularity, a link level granularity), a latency constraint, a bandwidth constraint (e.g. minimum bandwidth, excess bandwidth), service duration (e.g. start time, end time), protection level (e.g. no protection, or other protection levels), link type (e.g. dedicated, diverse, etc.), and a cost matrix (e.g. price charge information for the requested service). It should be noted that a service contract (e.g. service policies) may be in place between a client operator who operates the DCC 610 and DCs 631 and a service provider who provides the transport network 640 prior to the initiation.

In an example embodiment, a DCC 610 may initiate a VNS negotiation for dedicated P2MP connections between a source CE A 631 and destination CEs B, C, and D 631 and may request a VNT. The CE A 631 may comprise a port a connecting to a transport network 640 via a port x of a network node 1 641. The destination DC CE B 631 may comprise a port a connecting to the transport network 640 via a port y of a network node 7 641. The destination DC CE C 631 may comprise a port a connecting to the transport network 640 via a port y of a network node 3 641. The destination DC CE D 631 may comprise a port a connecting to the transport network 640 via a port y of a network node 8 641. As such, the DCC 610 may construct a location profile specifying a source A.a-1.x and a list of destinations B.a-7.y, C.a-3.y, and D.a-8.y.

When an NPC 620 receives the VNS negotiation initiation, the NPC 620 may estimate network resources, compute paths for the requested connections according to the VNS negotiation initiation parameters. For example, the computed paths may include a path 661 between DC CE A 631 and DC CE C 631 (e.g. dark solid lines in the transport network 640), a path 662 between DC CE A 631 and DC CE B 631 (e.g. dark dashed lines in the transport network 640), and a path 663 between DC CE A 631 and DC CE D 631 (e.g. dark dotted lines in the transport network 640). After allocating the network resources and computing the network paths, the NPC 620 may abstractly represent the computed network paths in the form of a VNT according to a network abstraction granularity level and may notify the DCC 610 of the VNT (e.g. available network resource for transporting data between the requested source CEs 631 and destination CEs 631).

Figure 7A:
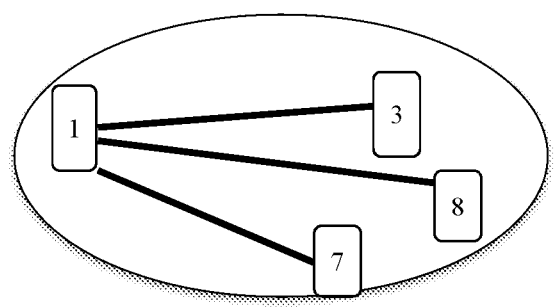
FIG. 7A is a schematic diagram of an example embodiment of a VNT.

In an example embodiment, the DCC 610 may request for a network abstraction granularity level at a network endpoint granularity. In such an example embodiment, the NPC 620 may respond with a VNT comprising resource information (e.g. bandwidth, latency, etc.) between the CEs 631 and may not include resource information for the internal network nodes 641 (e.g. network nodes 141) or links (e.g. links 142) along the computed paths. For example, the VNT may comprise a single virtual link that represents the path 661 between network nodes 1 and 3, a single virtual link that represents the path 662 between network nodes 1 and 7, and a single virtual link that represents the path 663 between network nodes 1 and 7 as shown in VNT 710 of FIG. 7A.

Figure 7B:
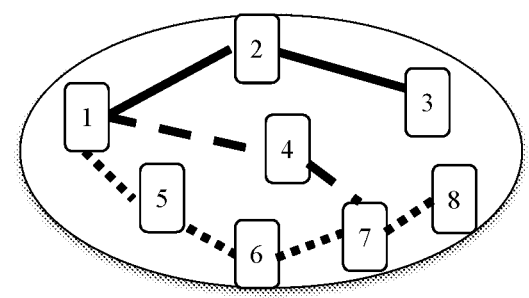
FIG. 7B is a schematic diagram of another example embodiment of a VNT.

In another example embodiment, the DCC 610 may request for a network abstraction granularity level at a link level granularity. In such example embodiment, the NPC 620 may respond with a VNT comprising resource information between the DC CEs 631, as well as network nodes 641 and links along the computed paths in the transport network 640 as shown in VNT 720 of FIG. 7B. In some other example embodiments, the NPC 620 may abstract a portion of the transport network 640 into a single virtual node with at least two ports (e.g. one input port and one output port) while providing network nodes 641 and links of another portion of the transport network 640. The formulation of a VNT may depend on various factors, which may include a client's request and/or a client service agreement and may allow for various granularity levels of abstraction.

Figure 8:
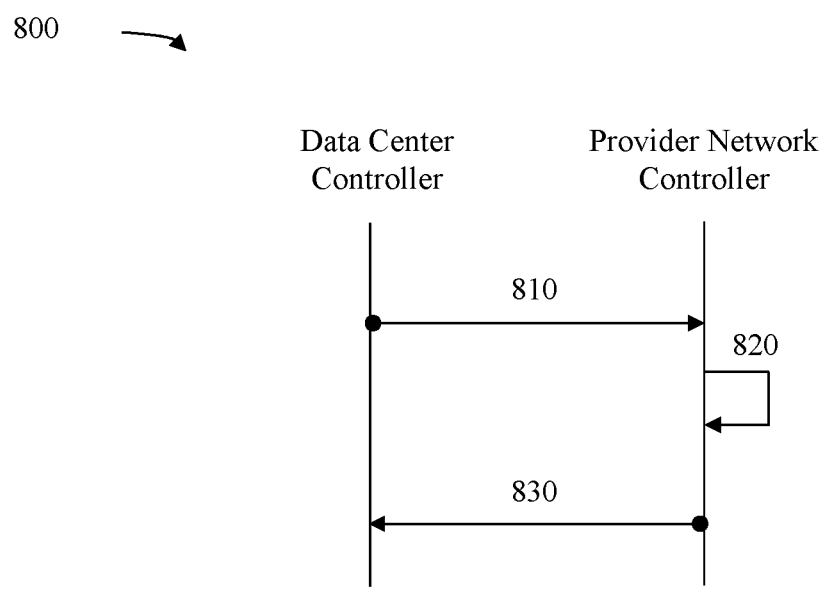
FIG. 8 is a protocol diagram of an example embodiment of a VNS negotiation method.

FIG. 8 is a protocol diagram of an example embodiment of a VNS negotiation 800 method, which may be implemented between a DCC (e.g. DCC 610) and an NPC (e.g. 620). Method 800 may be implemented as part of a VNS negotiation in method 600. Method 800 may begin after a service contract is established between a network provider and a DC operator. The network provider may provide a provider network (e.g. network 640) and the NPC may manage the provide network. The DC operator may operate a plurality of DCs (e.g. DCs 630) and the DCC may control the DCs and manage interconnections of the DCs. The DCs may comprise DC endpoints (e.g. DCs 231 or 631) connecting to the provider network. At step 810, the DCC may initiate a VNS negotiation with the NPC by sending a VNS negotiation initiation message to the NPC to connect the plurality of DCs. The initiation message may include parameters substantially similar to the VNS negotiation initiation parameters in method 600 described herein above.

At step 820, upon receiving the network query request from the DCC, the NPC may estimate network resources and compute paths according to the parameters in the VNS negotiation initiation parameters. At step 830, the NPC may send a VNS response message to the DCC in a form of a VNT. The granularity level of the VNT may depend on the initiation parameters. For example, when the initiation specifies a network endpoint granularity, the VNS response message may comprise resource information (e.g. capacity, cost, latency, etc.) between the DC endpoints, but may not include resources of links (e.g. links 142) or network nodes (e.g. network nodes 141 or 641) along the computed paths. Alternatively, when the initiation specifies a link level granularity, the VNS response message may comprise network resources between the DC endpoints as well as network nodes and links along the computed paths. It should be noted that the messages at steps 810 and 830 may be implemented as OpenFlow API calls.

Figure 9:
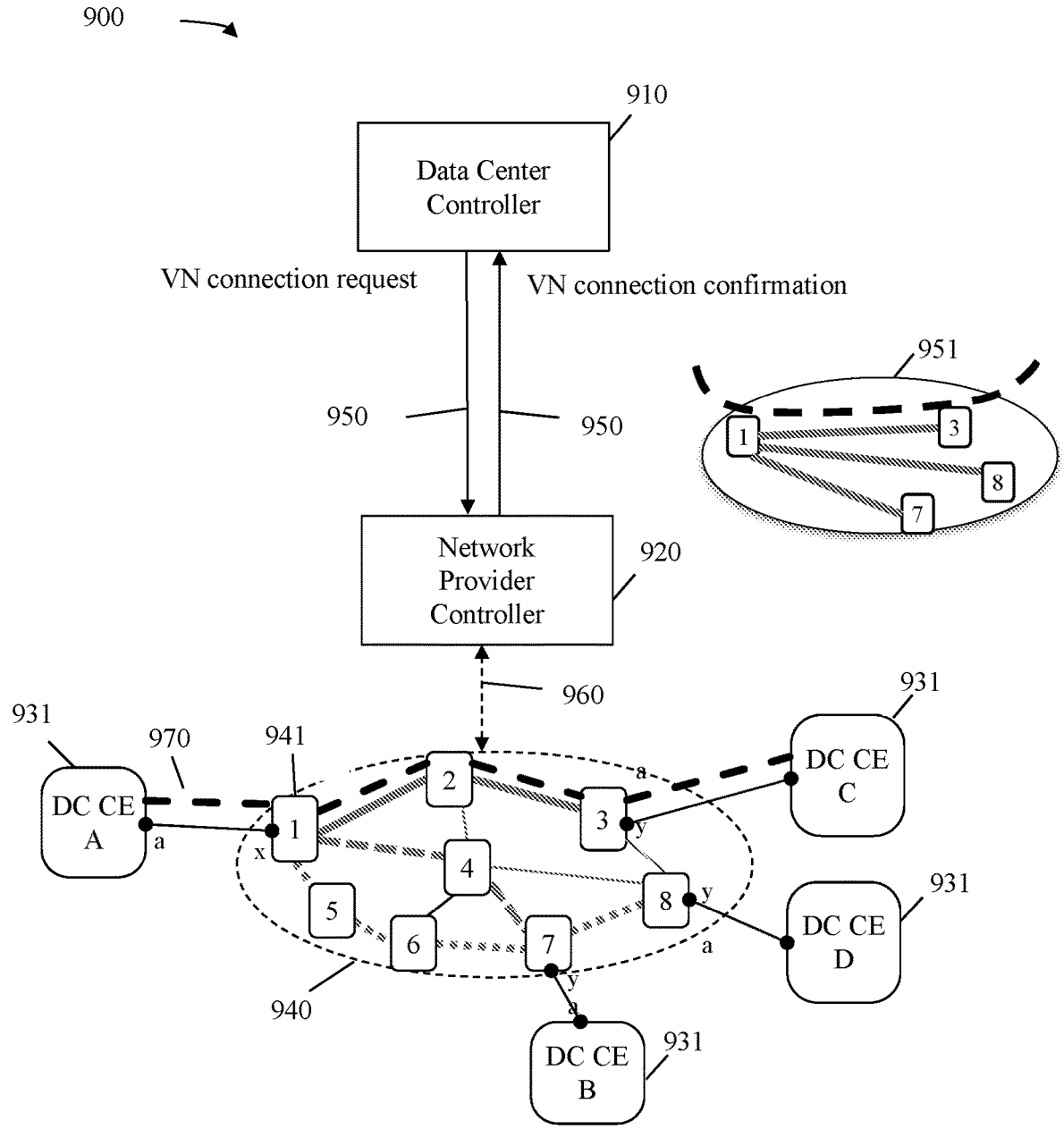
FIG. 9 illustrates an example embodiment of a VN connection setup method in a DCI network.

FIG. 9 illustrates an example embodiment of a VN connection setup method 900 in a DCI network, which may be substantially similar to the DCI network 200. In method 900, a DCC 910 (e.g. DCC 610) may request an NPC 920 (e.g. NPC 620) to establish a VN connection (e.g. network resource reservation) between a source DC CE A 931 (e.g. DC CE 631) and a destination DC CE C 931 via a transport network 940 (e.g. network 640) with interconnecting network nodes 941 (e.g. network nodes 641). It should be noted that a VNS may be negotiated between the DCC 910 and the NPC 920 prior to the VN connection request via substantially similar mechanisms as described in method 600. The DCC 910 may communicate with the NPC 920 via a CVNI 950 (e.g. CVNI 650). The VN connection request may comprise parameters substantially similar to the initiation parameters in method 600 as described herein above. Upon receiving the VN connection request, the NPC 920 may generate commands to setup a connection 970 across the network 940 (e.g. depicted as a dashed black line) between DC CE A 931 and DC CE C 931 and send a connection confirmation to the DCC 910.

In some example embodiments, the DCC 910 may compute a virtual path between the DC CE A 931 and DC CE C 931 in a VNT 951 (e.g. VNT 651) and may send a VNE connection setup command for each VNE in the computed virtual path to the NPC 920. When a VNE connection setup command is for a VNE that corresponds to a network node 941, the NPC 920 may convert the VNE connection setup command into a connection command for the network node 941 and may send the connection command to the network node 941 via a CDPI 960 (e.g. CDPI 160). When a VNE connection setup command is for a VNE that corresponds to a sub-network (e.g. a group of network nodes 941) in the transport network 940, the NPC 920 may compute a sub-network path across the sub-network, generate connection commands for the network nodes 941 in the sub-network path, and send the connection commands to the network nodes 941 via a CDPI. It should be noted that allocated paths (according to method 600) are shown in grey scale in FIG. 9. Such paths may remain allocated to DCC 910 after setup of connection 970 or released for other operation depending on the embodiment.

Figure 10:
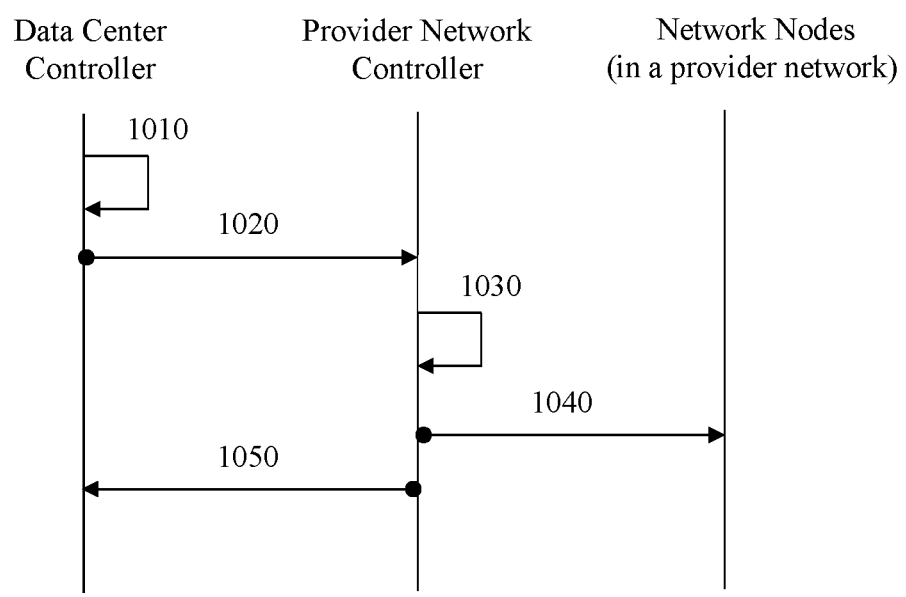
FIG. 10 is a protocol diagram of an example embodiment of a VN connection setup method.

FIG. 10 is a protocol diagram of an example embodiment of a VN connection setup method 1000, which may be implemented between a DCC (e.g. DCC 610 or 910), an NPC (e.g. NPC 620 or 920), and network nodes (e.g. network nodes 641) in a provider network (e.g. network 640 or 940). Method 1000 may be implemented as part of a virtual network connection setup in method 900. Method 1000 may begin after the DCC completes a VNS negotiation with the NPC (e.g. via method 800) for a DCI between a source DC CE (e.g. DC CE 631 or 931) and one or more destination DC CEs. The NPC may provide a VNT to the DCC at the end of the VNS negotiation. At step 1010, the DCC may compute paths through VNEs of the VNT for a connection between the source DC and one of the destination DCs. At step 1020, the DCC may send a VN connection request message to the NPC. The VN connection request message may comprise one or more VNE connection setup commands. At step 1030, upon receiving the VN connection request message, the NPC may convert the VNE connection commands into commands for setting up the network nodes corresponding to the VNEs. When a VNE is a sub-network (e.g. abstraction), the NPC may compute a sub-network path through the sub-network and may generate connection setup commands for network nodes along the sub-network path. At step 1040, the NPC may send the connection setup commands to the network nodes that correspond to the VNEs or in the computed sub-network path. The connection setup command at step 1040 may be shown as a single step, but may involve multiple steps and may vary depending on the interface protocols. At step 1050, after all the connections are setup, the NPC may send a VN connection reply message to the DCC confirming the VN connection request message. It should be noted that the VN connection request message at step 1020, the commands at step 1040, and the VN connection reply message at step 1050 may be implemented as OpenFlow API calls.

Figure 11:
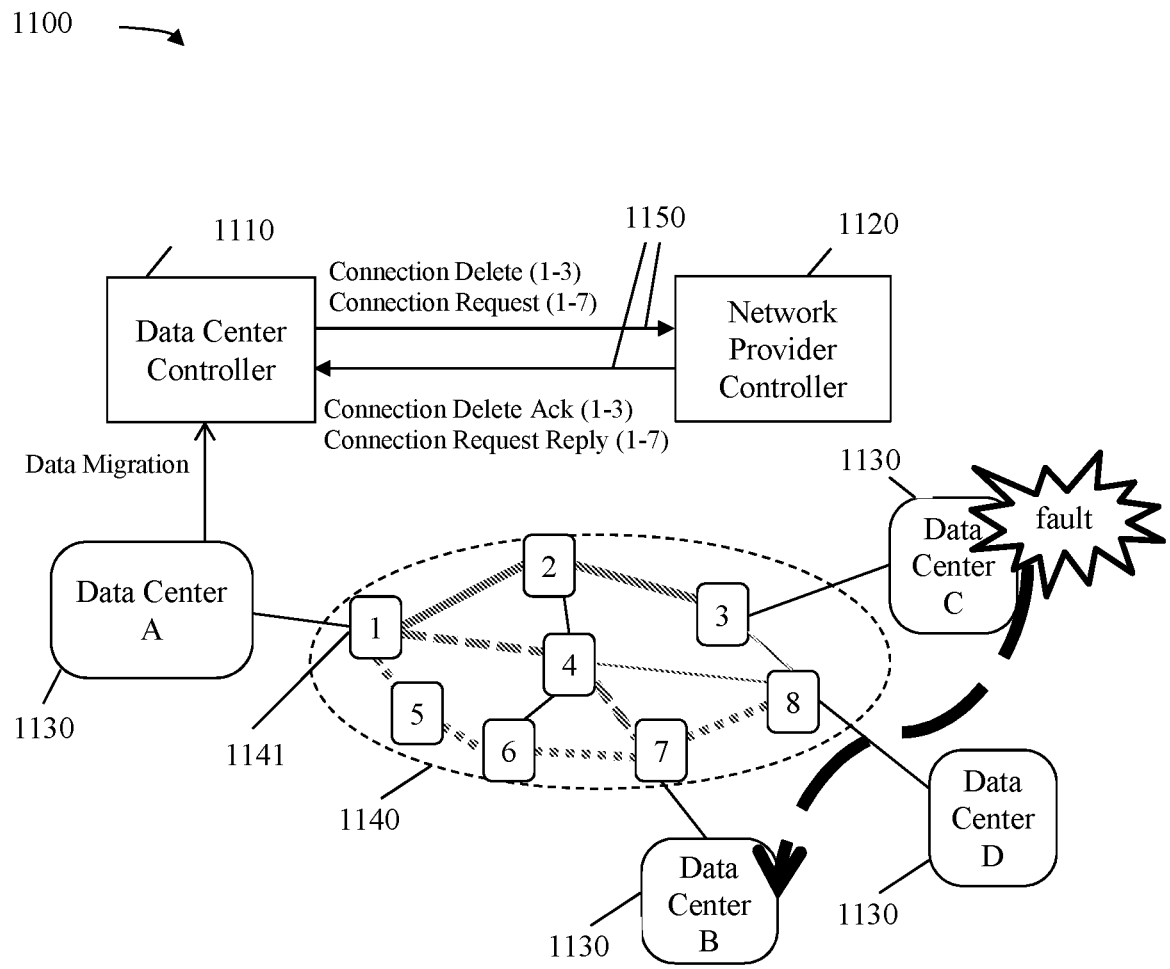
FIG. 11 illustrates an example embodiment of a fault monitor, detection, and recovery scenario in a DCI network.

FIG. 11 illustrates an example embodiment of a fault monitor, detection, and recovery method 1100 in a DCI network, which may be substantially similar to DCI network 200. In method 1100, a plurality of DCs A, B, C, and D 1130 (e.g. DCs 230) may be connected by a transport network 1140 (e.g. network 240) managed by an NPC 1120 (e.g. NPC 220). For example, DC A 1130 may be connected to the transport network 1140 via a network node 1 1141 (e.g. network node 141) and may be managed by DCC 1110 (e.g. DCC 210), DC C 1130 may be connected to the transport network 1140 via a network node 3 1141, DC D 1130 may be connected to the transport network 1140 via a network node 8 1141, and DC B 1130 may be connected to the transport network 1140 via a network node 7. In method 1100, a network administrator at DC A1130 may be monitoring for faults in the DCI network. Upon detection of a fault, for example, at DC C 1130, the network administrator may initiate an alternative network connection between DC A 1130 to DC B 1130. The DCC 1130 may employ CVNI 1150 (e.g. CVNI 250) to request that the NPC 1120 delete the connection between network nodes 1 and 3 1141 and connect network nodes 1 and 7 1141 (e.g. via network resource reservation). The NPC 1120 may respond to the DCC 1110 by sending an acknowledgement for the connection delete request and a reply for the connection request via CVNI 1150. The alternative network connection between DC A 1130 and DC B 1130 may enable data to be migrated from DC A 1130 to the DC B 1130.

Figure 12:
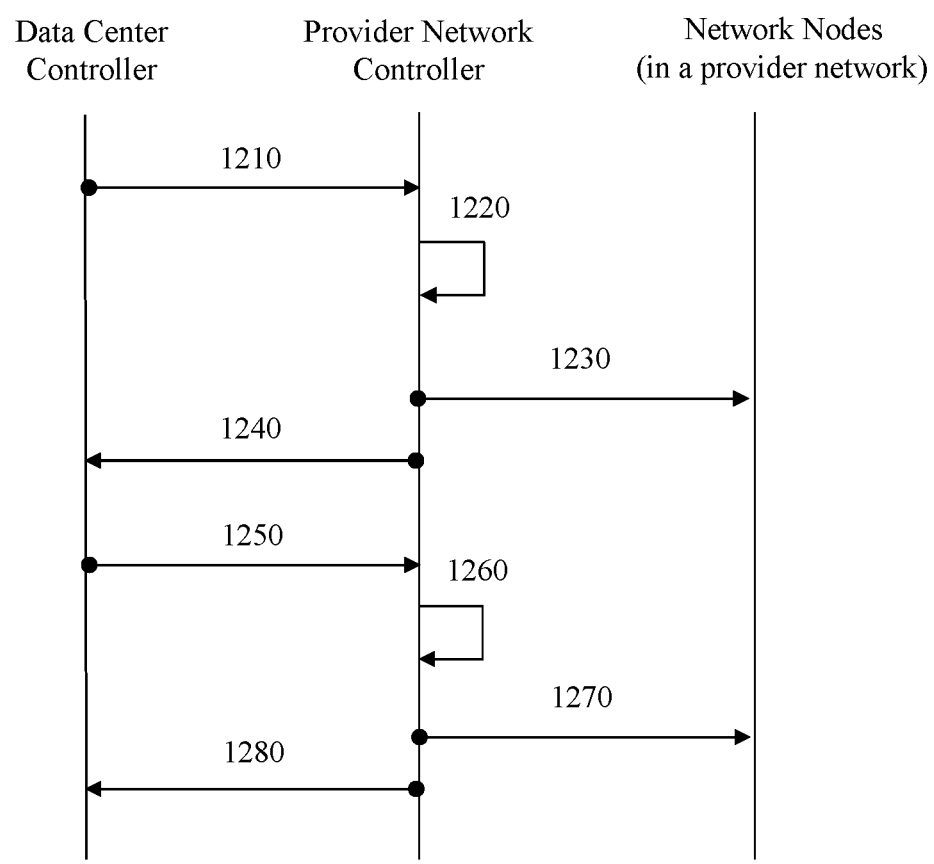
FIG. 12 is a protocol diagram of an example embodiment of a fault recovery method.

FIG. 12 is a protocol diagram of an example embodiment of a fault recovery method 1200, which may be implemented between a DCC (e.g. DCC1110), an NPC (e.g. NPC 1120), and network nodes (e.g. network nodes 1141) in a provider network. Method 1200 may be implemented as part of a fault recovery in method 1100. Similar to method 1100, the DCC may manage DCs A, B, and C (e.g. DCs 1130) located at different geographical locations connecting to the provider network (e.g. network 1140) comprising the network nodes controlled by the NPC, where a VN connection may be established between DC A and DC C and a VNS may be negotiated for a connection between DC A and DC B. Method 1200 may begin when a network administrator detects a fault at DC C and may instruct the DCC to perform fault recovery. At step 1210, the DCC may send a VN connection deletion request message to the NPC to delete the virtual connection between DC A and DC C. At step 1220, upon receiving the virtual connection request, the NPC may convert the VN connection delete request message into connection delete commands for network nodes along a connection path between DC A and DC C. At step 1230, the NPC may send the connection delete commands to the network nodes along the connection path between DC A and DC C. At step 1240, the NPC may send a connection delete acknowledgement message to the DCC. At step 1250, the DCC may send a VN connection request message to the NPC to setup a VN connection between DC A and DC B. At step 1260, in response to the VN connection setup request, the NPC may compute paths and/or convert the VN connection setup request to connection setup commands for provider network nodes to establish the connection between DC A and DC B. At step 1270, the NPC may send the connection setup commands to the network nodes along the connection path between DC A and DC B. At step 1280, after the connection setup is completed, the NPC may send a VN connection reply message to the DCC to confirm the setup of the connection. Subsequently, data may be migrated from DC A to DC B. It should be noted that the VN connection setup steps 1250-1280 may be substantially similar to method 1000. In addition, the messages between the NPC and the DCC, as well as messages between the NPC and the network nodes in method 1200 may be implemented as OpenFlow API calls.

In an example embodiment of an optical transport network, a use case as defined in Open Networking Foundation (ONF) document Optical Transport Use cases by Piotr Myslinksi, et. al, which is incorporated herein by reference, may include a VNS establishment, a VN connection, a VNE connection, and fault monitor, detection, and recovery. The use case scenario may concern pre-virtual network connection information exchange and its workflow. The exchange process may involve negotiation of a VNS between a DCC (e.g. DCC 210) and an NPC (e.g. NPC 210) within the confines of established business agreement between a DC operator that operates the DCC and a service provider that operates the NPC. This process may provide two objectives. The first objective may be to verify the established business agreement between the DC operator and the service provider. The second objective may be to automate business negotiation and/or re-negotiation, and VNS creation processes. A customer may define the need for a VN within the provider's transport network and then may contact the service provider to negotiate a contract for a VNS. The customer may provide a traffic demand matrix as part of its VNS request and the service provider may compute and present to the customer one or more VNs that support the requested objective including bandwidth. Each VN may comprise one or more VNEs, which may be interconnected by virtual links and may be characterized by means of a number of attributes (e.g. committed bandwidth, excess bandwidth, latency, maximum number of supported connections, etc.).

The negotiation of a VNS may be per VNS instance. The VNS may be instantiated before the first VN connection is to be set up. The instantiation of the VNS may result in allocation of committed resources of the VN. The resources in the network path in the sub-network (e.g. cross connect resources) may only be allocated when a VNE connection setup is performed.

In an example embodiment of a VNS negotiation initiation in the optical transport network use case, the VNS negotiation may be between a DCC and an NPC. An actor that initiates a VNS negotiation may be the DCC. As a client to a transport network, the DCC may be interested in knowing relevant transport network resource information, especially in light of DCI. Initially, the DCC may negotiate with the NPC to identify a set of endpoints it wishes to connect. As part of the negotiation, the DCC may also express traffic characteristics that need to be supported between the set of endpoints such as traffic demand (e.g. bandwidth), and QoS requirements associated with DC endpoint interface pairs.

To allow negotiation to take place, the correspondence between DC endpoint interface identifiers (DC EPID) and provider network endpoint interface identifiers (PN EPID) may be established. This may be accomplished using a manual process (e.g. exchanging identifiers between DC operations and a provider network operation personnel) or it may be automated (e.g. using LLDP) to exchange endpoint identifiers at UNIs. If the endpoint interfaces are under SDN control (e.g. OpenFlow) this exchange may be done using PACKET_OUT and PACKET_IN messages. By this exchange both the DCC and the NPC may acquire the association between the DC EPID and the PN EPID. Usage of protocols such as the LLDP or the OpenFlow protocol may require some authentication of the exchanged information or of the end-points that exchange the information.

During a VNS service negotiation with the DCC, the NPC may create a response to the DCC with an associated VN. If the DC endpoints are identified in a CVNI (e.g. CVNI 250) using the DC EPIDs, the NPC may translate each of the DC EPIDs to the associated PN EPIDs before proceeding to process the VNS negotiation request. If the endpoints are identified by the DCC using an identifier (ID) pair (DC EPID, PN EPID), the NPC may not access a translation service and may process the request using its own identifier from each ID pair. The NPC may provide a VN in response to the DCC. The granularity of the VN may have been pre-negotiated by a mutual business contract and policy and may be expressed in terms of VNEs and virtual links and their identifiers. In order to provide a relevant VN, the NPC may initiate a request to a virtual network computation entity of the NPC and may determine feasibility of the request. The corresponding result may be sent by the NPC to the DCC.

A VNS negotiation initiation and/or response may include a set of minimum parameters, such as a VNS instance identifier, a traffic matrix element, location information element, and a VN description element. The VNS instance identifier may identify a particular instance of a VNS. The traffic matrix element may describe traffic demand and other QoS information associated with DC endpoint interface pairs (e.g, latency). The traffic matrix element may include a connectivity type, a bandwidth type, and the connectivity's directionality. For example, a connectivity type may include P2P, P2MP, multipoint-to-multipoint (MP2MP) (e.g. any cast), or rooted-multipoint. A bandwidth type may include committed bandwidth resource, excess bandwidth resource, or shared pool. Each connectivity type may include a directionality (e.g. unidirectional, bidirectional). The location information element may describe DC endpoint interfaces (e.g. CEs 231) associated with a connectivity type. For unidirectional connectivity, a source list and a destination list may need to be distinguished. The VN description element may describe VNEs and virtual links and their identifiers that belong to the VN.

Following negotiation of the VNS, the NPC may allocate network resources needed to fulfill the agreed upon VN. When these resources have been allocated, the NPC may notify the DCC of the availability of the VN for transport of information between DC endpoints. The resources in a network path in a sub-network (e.g., cross connect resources) may only be allocated when a VNE connection setup is performed, as discussed herein.

In an example embodiment of a VN connection setup in the optical transport network use case, a DCC may receive a service request from one of its business applications or from its network engineering function and the DCC's path computation function may compute a path through a VN based on a VNS establishment process as described herein above. After completing the path computation, the DCC may issue VNE connection set up commands and may send the commands via a CVNI (e.g. CVNI 250) to the NPC. An actor of a VNE connection command may be the DCC. The DCC may send a VNE connection set up command to each VNE in the path computed by a DCC's path computation function, and each VNE sets up the connection in the NE or in a sub-network represented by the VNE. The DCC may be in full control of the path through its VNEs and virtual links and/or tunnels. When sending VNE connection commands to each VNE, it is the DCC's responsibility to provide relevant parameters to each VNE.

Any change of existing active VNE connections, such as bandwidth modification, may also be supported. There may be bandwidth modification or other changes to a VN state (e.g., capacity, delay, etc.) that falls outside the constraints of the existing VNS agreement and may necessitate a renegotiated VNS agreement. A renegotiation may be done based on a same VNS instance with modified attributes.

An actor of a VNE connection confirmation process may be the NPC. Upon the receipt of the VNE connection setup commands from the DCC, a VNE connection setup command may be converted into a command to set up a connection in an NE represented by the VNE, or the NPC's path computation function may be triggered on a VNE representing a sub-network in the provider network to compute a path through the sub-network that may comply with the VNE connection setup command. Following path computation on each VNE, the NPC may be responsible for setup of a connection in each NE within the computed path of the sub-network.

In some example embodiments, the VNE connection setup commands may not be able to be successfully completed. A sub-network outage, for example, may cause a setup command to fail due to insufficient bandwidth. A failure response may include enough information to permit a client to evaluate alternatives and may initiate new VNE connection commands. The recovery action may be done within constraints of an established service level agreement (SLA). Any recovery action beyond the SLA level may necessitate a renegotiated VNS agreement only if it has been agreed.

Multiple pre-negotiated policies may exist between an NPC and a DCC, their terms may depend on VNS contract, and the relationship of the NPC and DC administrative authorities. In an example embodiment, an NPC and a DCC may be operated by a same service provider, the NPC may provide more detailed information on the VNS. On the other hand, when an NPC and a DCC belong to different administrative entities, the NPC may hide network details and may apply additional security measurement to protect the network from potential attacks.

VNE connection commands and/or confirmations may be supported via a CVNI. VNE connection commands may include VNE connection set up, modify, and tear down commands. VNE connection commands and/or confirmations may support a minimum set of parameters for each VNE. The parameters may include a VNE identifier, a VNE connection description element, a location information element, a protection and/or restoration element, and a service duration element. The VNE identifier may identify a VNE. The VNE connection description element may describe a connectivity type, a bandwidth type and the connectivity's directionality, and other parameters for the VNE. For example, the connectivity type for each VNE connection instance may be expressed as P2P, P2MP, MP2MP, and rooted-multipoint. The bandwidth type for each VNE connection instance may be expressed as committed bandwidth resources, excess bandwidth resources, shared pool, or other bandwidth types. The directionality for each VNE connection instance may be expressed as unidirectional or bidirectional. The location information element may describe VNE connection endpoint interfaces (e.g. virtual links, physical links, or logical ports) associated with a VNE connection. For unidirectional VNE connections, a source list may be distinguished from a destination list. For rooted-multipoint VNE connections, a root, leaf, and leaf group ports may be described separately. The protection and/or restoration element may describe diversity criteria requested and/or applied for each VNE connection (e.g. diversity requirements relative to other VNE connections). The service duration element may specify a VNE connection duration in terms of a begin time and an end time. It should be noted that the service duration element may be optional. When the service duration element is not present, the end time may be undetermined and the connection for the VNS may begin immediately.

In an example embodiment of a fault monitoring, detection, and recovery in the optical transport network use case, fault monitoring information may be exchanged between a DCC and an NPC. This function may be complementary to SLA management and may be related to fault and performance notifications to the NPC with consequent actions. There may be two types of faults. The first type may be associated with VN resources failing, partial failing, or degrading. The second type may be associated with faults in VN connections. If a virtual link is protected or restorable as part of an SLA, then the NPC may hold off any failure and/or degradation report to the DCC while the NPC is protecting and/or restoring the virtual link. Some examples of faults or performance issues that may affect an SLA may include an irrecoverable fault in the optical transport network or service degradation. An irrecoverable fault may be caused by an ineffective protection and/or restoration in an optical transport network, an unmanaged failure in a backup facility, insufficient and/or pre-empted resources, or no deployment of survivability mechanisms. Service degradation may occur when an optical transport for DCI connection still exists, but the service is degraded, for example, a guaranteed bandwidth may not be satisfied, a required latency may not be satisfied (e.g. may be augmented with a current latency value), an increase in bit error rate (BER), and/or a decrease in effective bit rate (EBR). Some consequent actions resulting from fault and performance notifications may include an NPC determining to take appropriate consequent actions within the optical transport network (e.g. on a case-by-case basis) based upon associated network operator policies or triggering execution (e.g. through a DCC) of appropriate consequent action policies for clients or customers.

The present disclosure may benefit both DC operators and service providers. Such benefits may include improving optical transport network control and management flexibility (e.g. the ability to deploy third party client management and/or control systems) and development of new service offered by network virtualization. The CVNI may enable programmatic and virtual control of optical transport networks by allowing applications to have greater visibility and control over connections carrying the applications' data, and may enable monitoring and protection of the connections (e.g. subject to an operator policy).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein

We claim:

1. A network provider controller (NPC), comprising:
   a processor;
   a memory coupled to the processor and storing instructions for execution by the processor, wherein the processor is configured to execute the instructions to:
   receive a virtual network service (VNS) request from a client controller managing a first client end point and a second client end point, wherein the first client end point and the second client end point is connected by a network managed by the NPC, wherein the VNS request comprises an identifier of the first client end point and an identifier of the second client end point;
   obtain an identifier of a first node corresponding to the identifier of the first client end point and an identifier of a second node corresponding to the identifier of the second client end point, wherein the first node is in the network and connects to the first client end point, the wherein second node is in the network and connects to the second client end point;
   compute a virtual network that comprises a network path according to the identifier of the first node and the identifier of the second node, wherein the network path traverses the network between the first client end point and the second client end point;
   send a VNS response message comprising the virtual network to the client controller; and
   wherein the virtual network is computed according to a granularity of the virtual network, the granularity of the virtual network is expressed of virtual network elements and virtual links.

2. The NPC of claim 1, wherein the identifier of the first node is obtained from the virtual network service (VNS) request, wherein the virtual network service (VNS) request comprises a pair of the identifier of the first node and the identifier of the first client end point.

3. The NPC of claim 1, wherein the processor is configured to execute the instructions to translate the identifier of the first client end point to the identifier of the first node.

4. The NPC of claim 1, wherein the identifier of the first client end point and the identifier of the first node are exchanged between the NPC and the client controller.

5. The NPC of claim 4, wherein the identifier of the first client end point and the identifier of the first node are exchanged between the NPC and the client controller via link layer discovery protocol (LLDP).

6. The NPC of claim 4, wherein the identifier of the first client end point and the identifier of the first node are exchanged between the NPC and the client controller via PACKET-OUT and PAC_IN messages of OpenFlow protocol.

7. The NPC of claim 1, wherein the VNS request further comprises a traffic matrix element comprising traffic characteristics between the first client end point and the second client end point, and wherein the processor is configured to execute the instructions to compute the virtual network based on the traffic matrix element.

8. The NPC of claim 7, wherein the traffic matrix element comprises a connectivity type parameter, a bandwidth parameter, a quality of service (QoS) parameter, or combinations thereof, and wherein the connectivity type parameter comprises a point-to-point (P2P) connection, a point-to-multipoint (P2MP) connection, a multipoint-to-multipoint (M2MP) connection, a rooted multipoint, or combinations thereof.

9. The NPC of claim 1, wherein the VNS request further comprises the virtual network elements and virtual links.

10. The NPC of claim 1, wherein the granularity of the virtual network is pre-negotiated.

11. The NPC of claim 1, wherein the processor is further configured to execute the instructions to:
receive a virtual network connection request message from the client controller to setup a virtual connection between the first client end point and the second client end point;
generate connection commands for a first plurality of network elements (NEs) in the network according to the virtual network connection request message; and
send the connection commands to the first plurality of NEs.

12. The NPC of claim 1, wherein the VNS request is based on OpenFlow protocol.

13. The NPC of claim 1, wherein the client controller is a data center (DC) controller, the first client end point is an end point in a first DC associated with the DC controller, the second client end point is an end point in a second DC associated with the DC controller.

14. A method performed by a network provider controller (NPC), comprising:
receiving a virtual network service (VNS) request from a client controller managing a first client end point and a second client end point, wherein the first client end point and the second client end point is connected by a network managed by the NPC, wherein the VNS request comprises an identifier of the first client end point and an identifier of the second client end point;
obtaining an identifier of a first node corresponding to the identifier of the first client end point and an identifier of a second node corresponding to the identifier of the second client end point, wherein the first node is in the network and connects to the first client end point, the wherein second node is in the network and connects to the second client end point;
computing a virtual network that comprises a network path according to the identifier of the first node and the identifier of the second node, wherein the network path traverses the network between the first client end point and the second client end point;
sending a VNS response message comprising the virtual network to the client controller; and
wherein the virtual network is computed according to a granularity of the virtual network, the granularity of the virtual network is expressed of virtual network elements and virtual links.

15. The method of claim 14, wherein the identifier of the first node is obtained from the virtual network service (VNS) request, wherein the virtual network service (VNS) request comprises a pair of the identifier of the first node and the identifier of the first client end point.

16. The method of claim 14, wherein the obtaining an identifier of the first node comprises translating the identifier of the first client end point to the identifier of the first node.

17. The method of claim 14, wherein the identifier of the first client end point and the identifier of the first node are exchanged between the NPC and the client controller.

18. The method of claim 17, wherein the identifier of the first client end point and the identifier of the first node are exchanged between the NPC and the client controller via link layer discovery protocol (LLDP).

19. The method of claim 17, wherein the identifier of the first client end point and the identifier of the first node are exchanged between the NPC and the client controller via PACKET-OUT and PAC_IN messages of OpenFlow protocol.

20. The method of claim 14, wherein the VNS request further comprises a traffic matrix element comprising traffic characteristics between the first client end point and the second client end point, and wherein the virtual network is computed based on the traffic matrix element.

21. The method of claim 20, wherein the traffic matrix element comprises a connectivity type parameter, a bandwidth parameter, a quality of service (QoS) parameter, or combinations thereof, and wherein the connectivity type parameter comprises a point-to-point (P2P) connection, a point-to-multipoint (P2MP) connection, a multipoint-to-multipoint (M2MP) connection, a rooted multipoint, or combinations thereof.

22. The method of claim 14, wherein the VNS request further comprises the virtual network elements and virtual links.

23. The method of claim 14, wherein the granularity of the virtual network is pre-negotiated.

24. The method of claim 14, further comprising:
receiving a virtual network connection request message from the client controller to setup a virtual connection between the first client end point and the second client end point;
generating connection commands for a first plurality of network elements (NEs) in the network according to the virtual network connection request message; and
sending the connection commands to the first plurality of NEs.

25. The method of claim 14, wherein the VNS request is based on OpenFlow protocol.

26. The method of claim 14, wherein the client controller is a data center (DC) controller, the first client end point is an end point in a first DC associated with the DC controller, the second client end point is an end point in a second DC associated with the DC controller.

* * * * *